United States Patent [19]

Tsuchiya et al.

[11] Patent Number: 4,500,075

[45] Date of Patent: Feb. 19, 1985

[54] AIR PRESSURE SHOCK ABSORBER

[75] Inventors: Tatsuo Tsuchiya; Kazuhiro Hozumi, both of Asahi, Japan

[73] Assignees: Matsushita Electric Industrial Co., Ltd., Kadoma; Kuroda Precision Industries Ltd., Kawasaki, both of Japan

[21] Appl. No.: 331,752

[22] Filed: Dec. 17, 1981

[30] Foreign Application Priority Data

Dec. 18, 1980 [JP] Japan ................ 55-179176

[51] Int. Cl.³ .......................................... F16F 9/48
[52] U.S. Cl. ....................................... 267/8 R; 16/66; 16/84; 188/286; 188/318; 188/322.22; 267/8 A; 267/127
[58] Field of Search ............. 267/8 R, 8 A, 114, 126, 267/127; 188/284, 286, 287, 316, 318, 322.21, 322.22; 16/66, 84

[56] References Cited

U.S. PATENT DOCUMENTS

| | | | |
|---|---|---|---|
| 2,574,314 | 11/1951 | Arden | 267/114 X |
| 2,940,111 | 6/1960 | Patriquin | 16/66 |
| 3,042,957 | 7/1962 | Muessel et al. | 267/114 X |
| 3,147,967 | 9/1964 | Bougeard | 267/65 |
| 3,358,318 | 12/1967 | Ingham | 188/316 X |
| 3,768,793 | 10/1973 | Hampton | 267/8 R |
| 4,044,865 | 8/1977 | Tourunen | 188/287 |

FOREIGN PATENT DOCUMENTS

| | | | |
|---|---|---|---|
| 252046 | 2/1967 | Austria | 188/322.21 |
| 12204 | 5/1909 | Denmark | 267/114 |
| 951913 | 11/1956 | Fed. Rep. of Germany | 16/84 |
| 2718800 | 11/1977 | Fed. Rep. of Germany | . |
| 2625757 | 12/1977 | Fed. Rep. of Germany | . |
| 204635 | 10/1923 | United Kingdom | . |
| 284062 | 1/1928 | United Kingdom | . |
| 408592 | 4/1934 | United Kingdom | . |
| 427244 | 4/1935 | United Kingdom | . |
| 454722 | 6/1935 | United Kingdom | . |
| 528339 | 4/1940 | United Kingdom | . |
| 619150 | 9/1946 | United Kingdom | . |
| 628941 | 10/1948 | United Kingdom | . |
| 643505 | 9/1950 | United Kingdom | . |
| 828572 | 2/1960 | United Kingdom | . |
| 1070478 | 6/1967 | United Kingdom | . |
| 1428767 | 3/1976 | United Kingdom | . |
| 1527423 | 10/1978 | United Kingdom | . |

*Primary Examiner*—George E. A. Halvosa
*Attorney, Agent, or Firm*—Fleit, Jacobson, Cohn & Price

[57] ABSTRACT

An air pressure shock absorber for smoothly stopping a moving object reciprocated by a rod in an air pressure cylinder. The shock absorber absorbs and reduces the internal pressure of a chamber in the cylinder to smoothly stop the moving object by the communication of air compressed in the chamber to the atmosphere through a bypass passage formed in a cylinder wall. The air pressure is released to the atmosphere after the piston has moved through a predetermined stroke.

5 Claims, 10 Drawing Figures

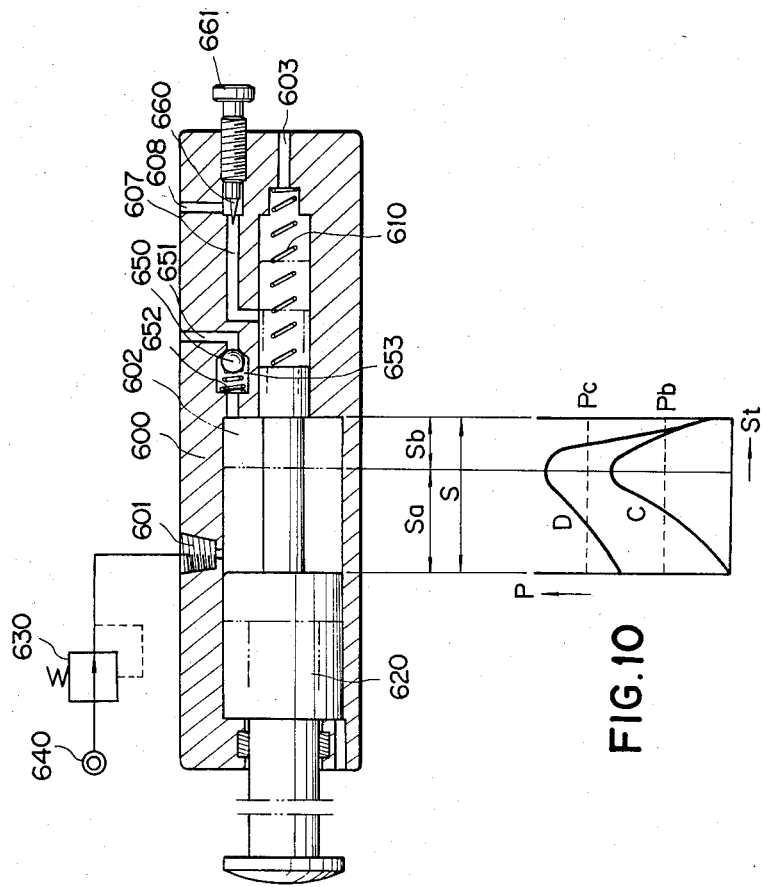

AIR PRESSURE SHOCK ABSORBER

BACKGROUND OF THE INVENTION

This invention relates to an improvement of an air pressure shock absorber and more particularly to an absorber to absorb inner pressure in a chamber in order to stop a moving apparatus fixed to a piston when the piston passes through a predetermined stroke at the end of a cylinder or a housing.

In the field of mechanical air pressure shock absorbers, it is very difficult to smoothly stop a piston or a moving apparatus after sufficient absorption of energy of the moving apparatus, since air is used as a medium in the condition of a pressed fluid.

In the conventional air pressure shock absorber shown in FIG. 1 and FIG. 2, a piston 30 is slidably provided at an end of a rod 31 with a return spring means 20 in a housing or a cylinder 10. When external force F is added on an end of the rod 31, the piston 30 moves resistingly against the spring means 20 in the right direction as shown in FIG. 1, and air in a chamber 11 for the piston is gradually pressed and the energy of external force F is accumulated. As shown in FIG. 1, at another end of the housing, there are holes 42 and 52. A throttle valve means 40 is provided in the end portion of hole 42 and valve 41 of the throttle valve means 40 is also controllably provided in the hole 42. The hole 52 extends to small chamber 54 in which a check valve means 50 including a ball 51 and a spring 53 is installed, and the small chamber 54 communicates with a hole 55 and the ball 51 is provided contactably with an opening of the hole 55.

By this construction of the shock absorber, where the throttle valve means 40 is closed, internal pressure Pa in the chamber 11 for the piston increases greatly at an end portion of the stroke as shown by a curved line A in FIG. 2 showing the relationship between the stroke of the piston and pressure in FIG. 2. The increased pressure produces backlash or rebound as a bouding phenomenon by the force of counteraction against the piston 30, with a smooth stopping function achieved with difficulty.

From these problems in the shock absorber, the throttle valve means 40 was generally used to reduce internal pressure in the chamber 11 for a piston to obtain and use the curved line B in FIG. 2. In this case, it could reduce the force of counteraction at the near end of the stroke, but the energy of the external force being absorbed is reduced, with the absorber of this type being used only in a limited field. Also, when external force added to the rod is strong, even if the throttle valve means 40 is opened, the above stated bouding phenomenon occurs.

SUMMARY OF THE INVENTION

The present invention provides a new and more useful air pressure shock absorber and a method of smoothly stopping a piston and a moving apparatus fixed thereto. The present invention of an air pressure shock absorber is used with a receiprocative piston means of an air pressure cylinder apparatus, and contains apparatus to absorb and reduce inner air pressure of a chamber and to stop softly the moving apparatus by means of communication with the air pressed chamber to the atmosphere after a piston moves over the predetermined stroke.

Accordingly, an object of the present invention is to provide an air pressure shock absorber which absorbs and reduces inner pressure of a chamber by means of communication with an air pressure chamber to the atmosphere after a piston moves over the predetermined stroke.

Another object of the present invention is to provide an air pressure shock absorber which prevents substantially a moving apparatus or piston from a rebouding phemomenon and stops smoothly the piston.

Still another object of the present invention is to provide an air pressure shock absorber which has at least one or more throttle valve means between a passage communicating with the atmosphere to control pressure at a predetermined decompressing stroke and to controllably increase the inner pressure in a chamber for a piston at a predetermined increasing stroke in accordance with the strength of an external force, and then to increase the capacity for absorption of energy on the piston.

A further objection of the present invention will be readily appreciated as the same becomes understood by reference to the following description.

BRIEF DESCRIPTION OF THE DRAWINGS

FIG. 9 is a front elevational section view showing a sixth embodiment of the present invention.

FIG. 10 is a wave form chart showing the characteristic pressure and stroke of a piston shown in FIG. 9.

THE DETAILED DESCRIPTION OF THE INVENTION

Figure 1:
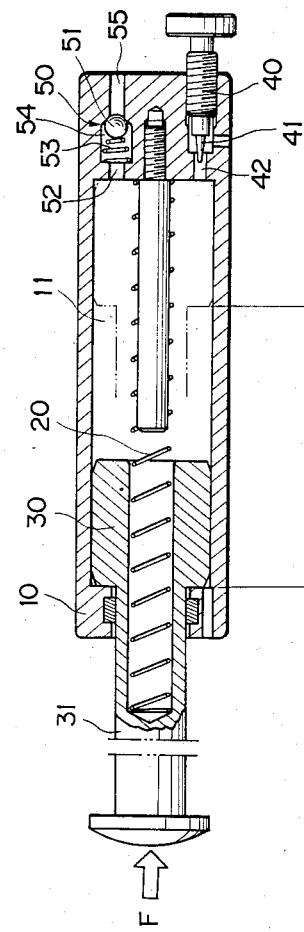
FIG. 1 is a front elevational section view showing a conventional air pressure shock absorber.

Referring to the drawings, there are shown several preferred embodiments of the present invention. Returning to FIGS. 3 and 4, a first embodiment of the present invention is shown therein. A piston 120 is slidably provided with a return spring means in a housing 100, a rod 121 fixed with the piston 120 at an end thereof extends outwardly from an end of the housing 100. At another end of the housing 100, both holes 102 and 103 are provided to communicate between a first chamber which is divided by the piston 120 in a chamber 101 for the piston and the atmosphere. A check valve 130 is provided on the way of the hole 102, and a throttle valve 140 is provided also on the way of the hole 103. A hole 104 which communicates with the atmosphere and a second chamber 102', that is, another side chamber which divided by the piston 120 and at the side which the rod extends in the chamber 101 is provided. In the drawings, a rod 150 which is rounded the spring 110 and receives the spring is shown.

In this embodiment, an opening is formed at an inner wall of a forward and a rear portion of the cylinder chamber, and another opening is formed at the inner wall of an intermediate portion of the cylinder chamber to open the divided chamber when the piston 120 passes beyond the opening at the inner wall of the intermediate portion, and a passage is provided in a wall of the cylinder to communicate between the openings of the intermediate portion and the forward portion to form a bypass passage 105. The bypass passage 105 is provided to communicate between an end of the first chamber and an intermediate portion of the chamber where the intermediate portion is a predetermined stroke of the piston in the chamber 101. A throttle valve 160 is provided on the way of the bypass passage 105.

Now, the function of the present embodiment of the present invention is explained. A condition shown in FIG. 3 appears that when an external force is not added to the rod 121, the piston 120 is pressed to an inner end of the housing 100 by the return spring means 110.

When external force is added to the rod 121, the rod 121 and piston 120 start to move in the right direction in the drawings, with the result that air pressure in the first chamber of the chamber 101 gradually increases in accordance with movement of the piston 120. When a rear end of the piston 120 passes an opening portion of the bypass passage 105 intermediate of the chamber 101, that is, at the place where the piston 120 moves a predetermined stroke Sa, both the first and second chambers divided by the piston 120 in the chamber 101 are communicated between by the bypass passage 105. Therefore, the pressed air in the first chamber flow to the second chamber, through the chamber on the rod side and through the bypass passage 105 and also simultaneously a part of the pressed air discharges to the atmosphere through the hole 104. Accordingly, remaining air pressure in the chamber 101 is reduced during the next stroke Sb and the moving apparatus, that is, the piston 120 smoothly stops.

Figure 4:
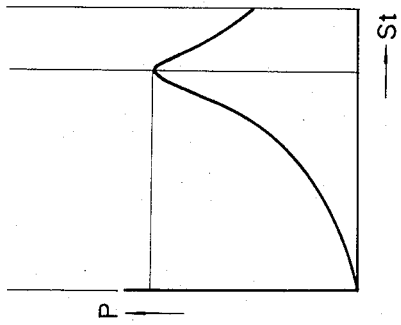
FIG. 4 is a wave form chart showing the characteristic pressure and stroke of a piston shown in FIG. 3.

A curved lines in FIG. 4 shows a condition of increasing and reducing manner of air pressure, the air pressure increases gradually from start of a stroke Sa to a point of a beginning of the stroke Sb and then the air pressure reduces from a beginning point of the stroke Sb to the last of the stroke.

Figure 3:
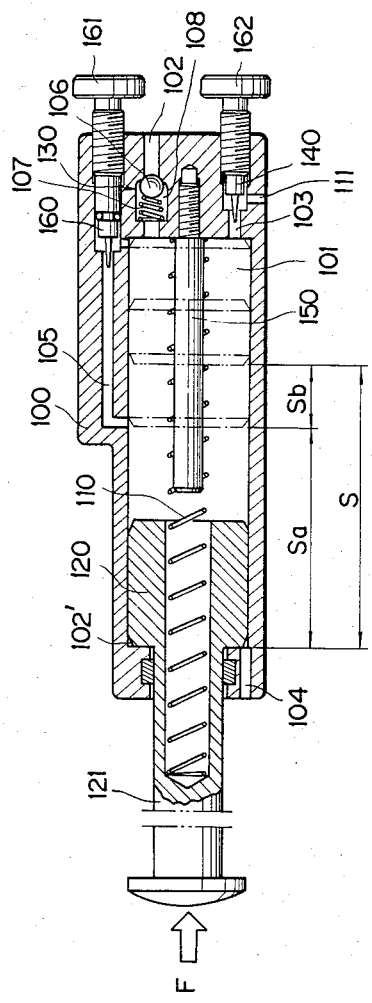
FIG. 3 is a front elevational section view showing a first embodiment of the present invention.

When external force is no longer added to the rod, the piston 120 is returned to the condition shown in FIG. 3 by the pressing force of the return spring means 110. At this time, the check valve opens and air flows into the first chamber in the chamber 101 through the hole 102.

Figure 5:
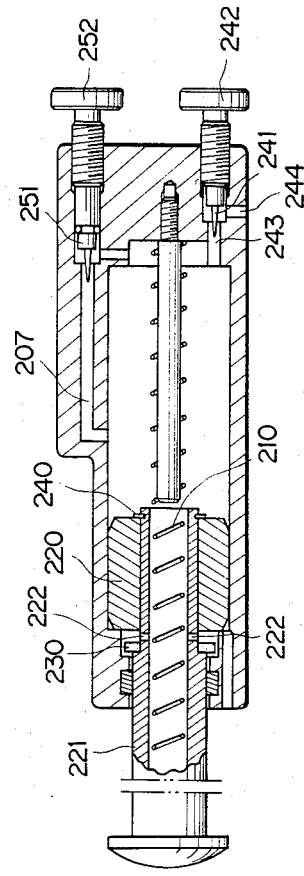
FIG. 5 is a front elevational section view showing a second embodiment of the present invention.

The second embodiment of the present invention is explained in accordance with FIG. 5. A different point from the above stated first embodiment of the present invention is in the check valve construction. In the second embodiment, a check valve means is constructed between a piston 220 and a rod 221. The piston 220 is slidably provided on the rod 221 and a packing 230 is put at one side around the rod 221 and a retaining ring 240 is fixed at an end portion of the another side of the rod 221 and the piston is able to slide between both the packing 230 and the retaining ring 240.

Further, a small hole 222 is formed to communicate with both inner and outer sides of the hollow rod 221. Therefore, when external force is added to the rod 221, the piston 220 and the packing 230 contact tightly and a chamber is divided by the piston 220 and both divided chambers which are formed on both sides of the piston 220 are closed and the piston is returned to the former position, both the side chambers open by force of the spring 210. Other features of this embodiment of the air pressure shock absorber are the same as the first embodiment.

A passage 207 is provided in the same manner as shown in FIG. 3, and holes 243 and 244 are provided to communicate with the chamber and the atmosphere side. A throttle valve 241 having a head 242 is arranged on the way of the holes 243 and 244, also another throttle valve 251 having a head 252 is arranged on the way of the passage 207.

Figure 6:
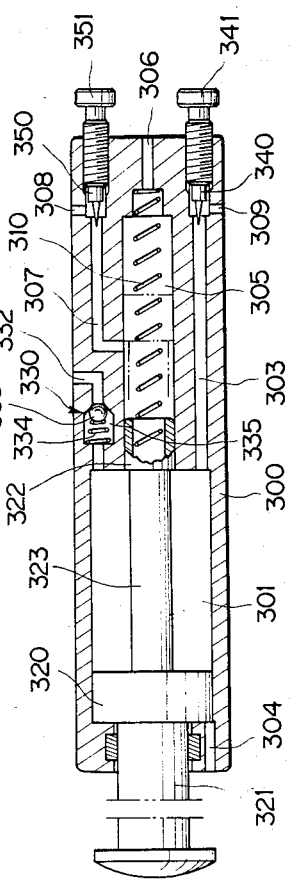
FIG. 6 is a front elevational section view showing a third embodiment of the present invention.

The third embodiment of the present invention is shown in FIG. 6. This embodiment provides two-stage or double pistons type absorbers. A large piston 320 is provided at an end of a rod 321 which extends from a housing 300, and a small diameter rod 323 extends oppositely from the rod 321 to an inward direction of the housing 300. A small piston 322 is provicded at an end portion of the small diameter rod as shown in the drawings. These pistons are slidably inserted in the housing 300.

A first chamber divided by the large piston 320, namely a chamber placed at the small piston direction communicates with the atmosphere by a hole 332 and a passage 303 through a hole 309, and also another side second chamber communicates with the atmosphere by a hole 304. A check valve 330 which comprises a ball 333 and a spring 334 in a chamber 335 is provided on the way of the hole 332 and a throttle valve 340 having a head 341 is also provided on the way of the passage 303. Further, return spring means 310 is arranged in a small chamber in which the small piston 322 slides, with the small chamber 305 communicating with the outer side through a hole 306.

A passage 307 is formed in the inner wall at an intermediate portion of the small chamber 305 to communicate with the outside through a hole 308 and a throttle valve 350 having a head 351 is provided on the way of the passage 307.

In this embodiment, when external force is added to the rod 321, the piston 320 moves to the right direction in the drawings, then air in the chamber is gradually compressed and air pressure increases. When the small piston 322 passes the opening of the passage 307 by movement of the predetermined stroke, the chamber 301 communicates with the passage 307 through an apeture between the rod 323 and a rear wall of the small chamber 305. Accordingly, the compressed air in the chamber 301 is discharged to the atomsphere with the throttle valve 350 from the passage 307. When external force is removed from the rod, the pistons are returned by force of the return spring means 310 to the condition shown in FIG. 6.

Figure 7:
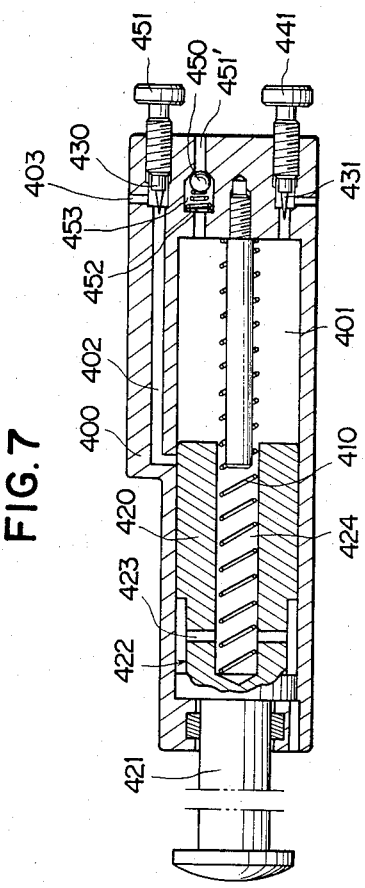
FIG. 7 is a front elevational section view showing a fourth embodiment of the present invention.

The fourth embodiment of FIG. 7 shows that a cylindrical groove 422 is formed on a spherical surface of a piston 420 which is fixed to a rod 421 and slides in a chamber 401 of a housing 400. A hole 424 which receives a returning spring 410 is communicated with the cylindrical groove by a hole 423. A passage 402 is formed within a wall of the chamber to open at an intermediate portion of the chamber 401 and to communicate with the outside, with a throttle valve 430 having a head 451 provided on the way of the passage 402.

In this embodiment, external force is added to a rod and accordingly the piston 420 moves forwardly to predetermined stroke, causing the cylindrical groove 422 and passage 402 to be aligned and to communicate.

Therefore, compressed air in the chamber 401 discharges to the atmosphere through the passage 402.

Figure 8:
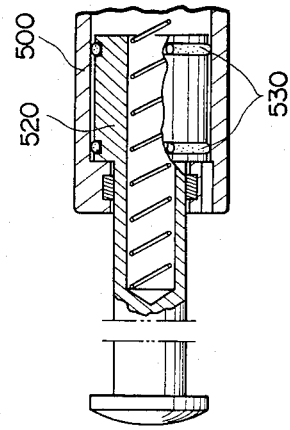
FIG. 8 is a front partially elevational section view showing a fifth embodiment of the present invention.

Fifth embodiment shown in FIG. 8 differs in the piston construction from the above-stated first embodiment explained with reference to FIG. 3. Namely, the piston shown in FIG. 3 is a metal sealing type, but the piston 520 shown in FIG. 8 is a packing sealing type, with a packing sealing member 530 arranged on the spherical surface of the piston 520 to seal with an inner surface of the housing 500.

The function of the fifth embodiment is the same as explained for the first embodiment of the present invention in FIG. 3.

Sixth embodiment shown in FIG. 9 has an air pressure supply apparatus to adjust the beginning pressure in a compression side chamber which is positioned in the right direction from a piston, that is, in a first chamber of the chamber for the piston divided by the piston. In all the embodiments shown in FIGS. 3 to 8, the beginning air pressure is zero and is the same as the pressure of the atmosphere. In comparison with these embodiments, the present embodiment shown in FIG. 9 is able to adjust and control the beginning pressure by supply of the compressed air in the chamber, then, if possible, absorbable energy is able to increase, and the compressed air chamber, that is, the first chamber is able to communicate with the atmosphere after the predetermined stroke of the piston.

In the embodiment, an air charging hole 601 is provided to open at an intermediate portion of the chamber 602 of a housing 600, and the hole 601 communicates with a compressed air source 640 through a pressure reducing valve 630.

In the condition that any external force is not added to the rod as shown on FIG. 9, the air charging hole 601 communicates with the chamber 602. When external force is added to the rod, the hole is closed by the piston 620 and is not opened until the piston 620 is returned to the prior portion position.

In a chamber, a spring means 610 is arranged and a hole 603 is provided at an end portion of the housing 600 to communicate the air compressed small chamber with the atmosphere side. Also, a passage 607 and a hole 608 are provided in the same manner as explained with respect to FIG. 6 and a throttle valve 660 having a head 661 is provided between both the passage 607 and the hole 608. And a check valve which comprises a ball 650 and a spring 652 in a chamber 653 is provided on the way of a hole 651 which communicates with a large chamber 602 and the atmosphere side in the same manner as explained with FIG. 6.

The present embodiment does not have the passage 303 and the throttle valve 340 shown in FIG. 6, but the external force is equivalent in accordance with adjustment of the pressure by a pressure reducing valve 630.

Figure 2:
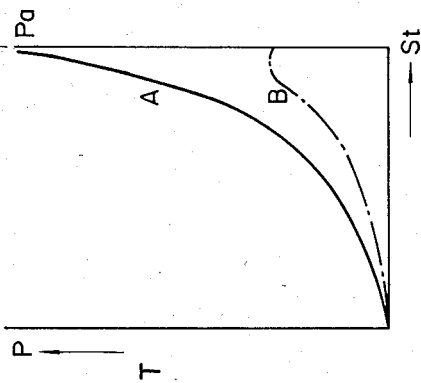
FIG. 2 is a wave form chart showing the characteristic of pressure and stroke of a conventional piston, shown in FIG. 1.

Further, as shown in the wave form chart of FIG. 10, when the beginning pressure is zero, that is, the atmosphere pressure being as in several embodiments shown in FIGS. 3 to 8, the characteristic of the pressure appears as a curved line C. But, the characteristic of this sixth embodiment of the present invention appears as another curved line D in FIG. 10. In FIG. 10, average pressure Pb is the curved line C in the chamber, and another average pressure Pc for the curved line D in the chamber. In both FIGS. 2 and 10, a mark P shows pressure and a mark St shows stroke or distance, moving the piston. Therefore, in accordance with increasing the beginning pressure, the average pressure is able to be increased and absorbable energy is raised.

As is well understood from the above-stated embodiments of the present invention, an air pressure absorber of an air pressure cylinder type apparatus, any reboud operation or bouding phenomenon of the moving article or piston is substantially prevented and a smooth stopping operation of the moving article is certainly actualized, since compressed air in the chamber positioned to the compression side in the housing discharges to the atmosphere pressure side by communication between the compressed chamber and reduced pressure side through at least one or more passages and holes when the piston passes a predetermined stroke and passes the opening of the passage means.

By arrangement of at least one or more throttle valves on the way of the passage communicating with the atmosphere side, it is possible to control and adjust air pressure at pressure reducing stroke Sb, and air pressure in the chamber at pressure increasing stroke Sa is able to increase in accordance with the strength of the external force, with the absorption capacity of energy increased more than with the conventional absorbers. Also the present invention is not only of a simple construction but also provides low costs for manufacturing of the absorber.

In the drawings, particularly, in FIGS. 3, 5, 6, 7 and 9, the throttle valve means and the check valve means are respectively shown as explained in FIG. 1. In FIG. 3, the check valve 130 comprises a ball 106 and a spring 107 in a chamber 108, and both the throttle valves 140 and 160 have respectively heads 161 and 162 and the throttle valve 140 communicates the hole 103 with the atmosphere through a hole 111. Also, in FIG. 7, a check valve which comprises a ball 450 and a spring 452 in a small chamber 453 in provided to communicate with the compressed chamber and the atmosphere side through a hole 451', and a throttle valve 431 having a head 441 is provided on a way of the hole to communicate and to control the compressed air between the chamber 401 and the atmosphere side.

In each embodiment, each throttle valve is controllable for the opening of the passage or hole to be used generally in any type of apparatus, but at least one or more orifices or unadjustable valve apparatus is able to be used in lieu of the adjustable or controllable valve apparatus.

The invention may be embodied in other specific forms without departing from its spirit or essential characteristics. The described embodiment is to be considered in all respect only as illustrative and not limiting and the scope of the invention is, therefore, indicated by the appendant claims rather than by the foregoing description. All changes which come within the meaning and range of equivalency of the claims are to be amended within their scope. Consequently, it is recognized that many variations may be made without departing from the scope or spirit of the present invention.

What is claimed is:

1. An air pressure shock absorber comprising:
   a cylinder defining a first opening at one end of said cylinder;
   a first chamber defined by said cylinder having a forward chamber portion and a rear chamber portion;
   a first piston slidably mounted in said first chamber;

a first piston rod mounted on said first piston, said first piston rod extending from the cylinder through said first opening;

spring means located in the cylinder for moving the piston by a pressing force;

a second chamber of smaller diameter than said first chamber defined by said cylinder located contiguous with the forward portion of said first chamber;

a second piston rod mounted at one end to the first piston opposite to said first piston rod;

a second piston slidably mounted in said second chamber of the cylinder, the other end of said second piston rod mounted on said second piston and said second piston being of said smaller diameter; and a bypass passage defined by an aperture in a wall of said cylinder communicating between said second chamber and the atmosphere, and said bypass passage rapidly releases compressed air in a forward portion of said first chamber of the cylinder to the atmosphere when the second piston moves a predetermined distance to position itself past the aperture to open said bypass passage to said first chamber due to a force pushing on an end of the outwardly extended first piston rod.

2. The air pressure shock absorber of claim 1 wherein a throttle valve means is positioned in said bypass passage.

3. The air pressure shock absorber of claim 1 wherein a controllable throttle valve means positioned in said cylinder communicates between said first chamber and the atmosphere.

4. The air pressure shock absorber of claim 1 further comprising:

an air charging hole defined by said cylinder wall and communicating with the forward portion of the first chamber; and a compressed air source including a pressure reducing valve positioned outside of the cylinder and said compressed air source communicating with said air charging hole.

5. The air pressure shock absorber of claim 4, wherein a throttle valve means is positioned in said bypass passage.

* * * * *